(12) United States Patent
Wisherd et al.

(10) Patent No.: US 6,593,885 B2
(45) Date of Patent: Jul. 15, 2003

(54) LOW COST DTOA LOCATION PROCESSING SYSTEM BASED ON MULTIPLE READERS-TO-SINGLE PROCESSOR ARCHITECTURE

(75) Inventors: David S. Wisherd, Sunnyvale, CA (US); Donald K. Belcher, Rogersville, TN (US)

(73) Assignee: Wherenet Corp, San Ramon, CA (US)

( * ) Notice: Subject to any disclaimer, the term of this patent is extended or adjusted under 35 U.S.C. 154(b) by 67 days.

(21) Appl. No.: 09/839,573

(22) Filed: Apr. 20, 2001

(65) Prior Publication Data

US 2002/0039080 A1 Apr. 4, 2002

Related U.S. Application Data

(63) Continuation-in-part of application No. 09/649,646, filed on Aug. 29, 2000
(60) Provisional application No. 60/200,071, filed on Apr. 27, 2000.

(51) Int. Cl.[7] .................................................. G01S 3/02
(52) U.S. Cl. ........................................ 342/463; 342/465
(58) Field of Search ................................. 342/450, 465, 342/463

(56) References Cited

U.S. PATENT DOCUMENTS

| | | | |
|---|---|---|---|
| 5,119,104 A | | 6/1992 | Heller ........................ 342/450 |
| 5,883,598 A | * | 3/1999 | Parl et al. .................... 342/457 |
| 5,920,287 A | | 7/1999 | Belcher et al. .............. 342/450 |
| 5,995,046 A | | 11/1999 | Belcher et al. .............. 342/450 |
| 6,167,275 A | | 12/2000 | Oros et al. ................... 455/456 |
| 6,285,321 B1 | * | 9/2001 | Stilp et al. ................... 342/465 |

\* cited by examiner

*Primary Examiner*—Mark Hellner
(74) *Attorney, Agent, or Firm*—Allen, Dyer, Doppelt, Milbrath & Gilchrist, P.A.

(57) ABSTRACT

A time division multiplexed reader to shared RF channel processor signal transport network for a geolocation system in which the number of readers is relatively small, allowing the use of only a single shared RF channel processor. The differential signal transport delays among respective segments of the network creates an inherent set of time division multiplexed time slots for the various readers, that allows the shared RF channel processor to receive and process the output of each reader in a known, independent time frame.

20 Claims, 4 Drawing Sheets

LOW COST DTOA LOCATION PROCESSING SYSTEM BASED ON MULTIPLE READERS-TO-SINGLE PROCESSOR ARCHITECTURE

CROSS-REFERENCE TO RELATED APPLICATIONS

The present application claims the benefit of co-pending U.S. Provisional Patent Application, Ser. No. 60/200,071, filed Apr. 27, 2000, by D. S. Wisherd et al, entitled: "Low Cost DTOA Location Processing System Based on Multiple Readers-to-Single Processor Architecture," and is a continuation-in-part of co-pending U.S. patent application Ser. No. 09/649,646, filed Aug. 29, 2000, by R. W. Boyd et al, entitled: "Multi-Lateration System With Automatic Calibration and Error Removal" (hereinafter referred to as the '646 application), each application being assigned to the assignee of the present application and the disclosures of which are incorporated herein.

FIELD OF THE INVENTION

The present invention relates in general to a radio-tagged object location and tracking system of the type described in the U.S. Patent to Belcher et al, U.S. Pat. Nos. 5,920,287 and 5,995,046, (hereinafter referred to as the '287 and '046 patents, respectively), assigned to the assignee of the present application and the disclosures of which are incorporated herein, and is particularly directed to a reduction in the number of reader and associated RF channel processor components where the environment does not demand a high density geolocation infrastructure. Reducing the number of readers to relatively small number allows the use of a shared RF channel processor, to which the reader outputs are coupled in a time division multiplexed manner, so that the single RF channel processor can handle the output of each reader in a known, independent time frame.

BACKGROUND OF THE INVENTION

The general architecture of the radio tagged object geolocation systems described in the above-referenced '287 and '046 Patents is diagrammatically shown in FIG. 1 as comprising a plurality of tag emission readers 10 that are installed at precisely geographically known and relatively unobtrusive locations in and/or around the perimeter of an asset management environment 12. In a typical environment, the readers may be spaced up to on the order 300 ft apart indoors and up to 750 ft apart outdoors.

The asset management environment contains a plurality of objects/assets 14, to which radio-containing 'tags' 16 are affixed. As a result of radio emissions from the tags 16, the locations of their associated objects 14 can be monitored on a continuous basis by the readers 10 and reported to an asset management data base 20. This data base is accessible by way of a computer workstation or personal computer 26.

In order for the system to locate and track the objects, each radio tag 16 repeatedly transmits or 'blinks' a short duration, wideband (spread spectrum) pulse of RF energy, that is encoded with the identification of its associated object and auxiliary information that may be stored in tag memory. These short duration tag emissions are detected by the tag emission readers 10.

Coupled with each tag reader is an associated reader RF channel processor, which correlates the spread spectrum signals received from a tag with a set of spread spectrum reference signal patterns, in order to determine which spread spectrum signals received by that reader is a first-to-arrive spread spectrum signal burst as transmitted from a tag. Typically, RF transmissions from a tag are received at each reader with a delay of about one nanosecond for each foot of distance between them.

The identified first-to-arrive signals are then forwarded (via a coaxial cable plant) to an object geolocation processor, which performs time-of-arrival differentiation of the detected first-to-arrive transmissions, and locates (within a prescribed spatial resolution, e.g., on the order of ten feet) the tagged object of interest.

Because the lengths of cable plant installed between the readers' associated RF channel processors and the differential time-of-arrival processing subsystem of a typical installation will vary among the various reader locations of the system infrastructure, they, as well as variations in environment, can be expected to introduce system timing errors (associated with the cable delays drifting due to weather or other effects such as age, humidity, temperature, physical stretching, and the like), resulting in geolocation errors.

Advantageously, the invention disclosed in the '646 application effectively obviates this signal transport delay problem by placing one or more 'reference' tags, whose geolocations are fixed and precisely known within the environment containing the objects to be tracked, and executing a background calibration routine at a relatively low cycle rate, to process emissions from the reference tags. Pursuant to this routine, the calculated geolocations of the reference tags are compared with their actual locations, and any offset between the measured and actual geolocation values is then used to adjust the time delays of the various lengths of cable plant between the readers' RF channel processors and the geolocation processor, so as to track out timing errors.

The above described geolocation system in which each reader has its own dedicated RF channel processor constitutes a relatively efficient use of resources for an environment having a large area and/or containing a relatively large number (e.g., thousands) of tags, where the readers and their associated RF channel processors are reused in up to four or more coverage zones. However, for a relatively small area environment having a lesser number (e.g., hundreds) of tags, the cost associated with installing a respective RF channel processor for each reader may be unacceptable to the user.

SUMMARY OF THE INVENTION

In accordance with the present invention, for an application that does not demand a high density geolocation infrastructure, the number of readers can be significantly reduced to only a few (up to about eight, as a non-limiting example). In addition, rather than dedicating a respective RF channel processor to each reader, plural reader outputs are time division multiplexed to a single shared RF channel processor, in a manner that allows the shared RF channel processor to receive and process each reader's output in a known, independent time frame. This reduction in the number of reader and RF channel processor components enables the cost of the infrastructure of the geolocation system to be significantly reduced.

A first embodiment of the time division multiplexed signal transport network has a serial interconnectivity architecture, implemented as a daisy chain transport path among multiple readers and the shared RF channel processor. Respective segments of the daisy chain interconnect contain embedded delays that enable the shared RF channel processor to accommodate the output of each reader in a known, independent time frame.

In addition to whatever delay is inherent in the sections of cable, the transport delays may also include additional amounts of delay that provide isolation from delayed multi-path signals within a read interval. By periodically measuring the delay of each transport segment using the calibration mechanism detailed in the above-referenced '646 application, timing errors in the times of occurrence of the first-to-arrive signals identified by the RF channel processor 50 can be effectively eliminated.

In order that the RF channel processor may determine which tag signal came from which reader, the RF signal emitted from a tag must be detected by that reader whose 'time slot' is the first time slot in the time slot sequence through which the reader outputs are time division multiplexed to the RF channel processor. If the geometry of the monitored environment is such that this cannot be effected for any reader at a perimeter location (such as an area corner), then an additional reader may be installed at a location that will ensure first detection, with the RF channel processor coupled directly to that reader.

A second embodiment of the time division multiplexed signal transport network has a parallel interconnectivity architecture, implemented as a star-configured set of transport paths among multiple readers and the shared RF channel processor. In the star configuration embodiment, the tag transmission readers are coupled via respective signal transport paths to a combiner, which is coupled to the RF channel processor. As in the serial embodiment, in addition to including whatever delay is inherent in their associated sections of cable, the transport delay stages of the star configuration embodiment impart additional delay, as necessary, to ensure isolation from delayed multi-path signals within a read interval. Also, these delays are preferably periodically measured using the calibration mechanism detailed in the '646 application, to eliminate timing errors in the times of occurrence of the first-to-arrive signals identified by the RF channel processor.

Because emissions from a tag are asynchronous, there is no convenient way of knowing a priori when any of the readers will receive a transmission. To resolve this problem, the output of each reader may be modulated with a 'signature' which associates that particular reader with the tag signal it receives. Non-limiting examples include amplitude and phase modulation. Of the two, phase modulation having a very low modulation index is more robust, and will not disrupt any existing modulations in use in the system. In addition, phase modulation may be readily detected in the RF channel processor by installing a straightforward software addition of demodulation code. Moreover, in the phase modulation approach, existing limiting and/or automatic gain control will not disrupt the signature signal. Also, the entire message length of a tag signal can be used to enhance detection probability.

DETAILED DESCRIPTION

Before detailing the time division multiplexed reader to shared RF channel processor signal transport network of the invention, it should be observed that the present invention resides primarily in an augmentation to a geolocation system of the type described in the above-referenced Belcher et al Patents and '646 application. As described briefly above, this augmentation involves the use of a time division multiplexed signal transport infrastructure through which signals received by each reader are coupled to and processed by a common or shared RF channel processor. As such, the invention is readily implemented in an arrangement of conventional communication circuits and associated digital signal processing components and attendant supervisory control circuitry therefor, that controls the operations of such circuits and components.

The configurations of such circuit components and the manner in which they interface with other communication system equipment have, therefore, been illustrated in readily understandable block diagram format, depicting details that are pertinent to the present invention, so as not to obscure the disclosure with details which will be readily apparent to those skilled in the art having the benefit of the description herein. Thus, the block diagram illustrations are primarily intended to show the major components of a tag-based geolocation system of the type described in the above-referenced '287 and '046 patents in a convenient functional grouping, whereby the present invention may be more readily understood.

Figure 1:
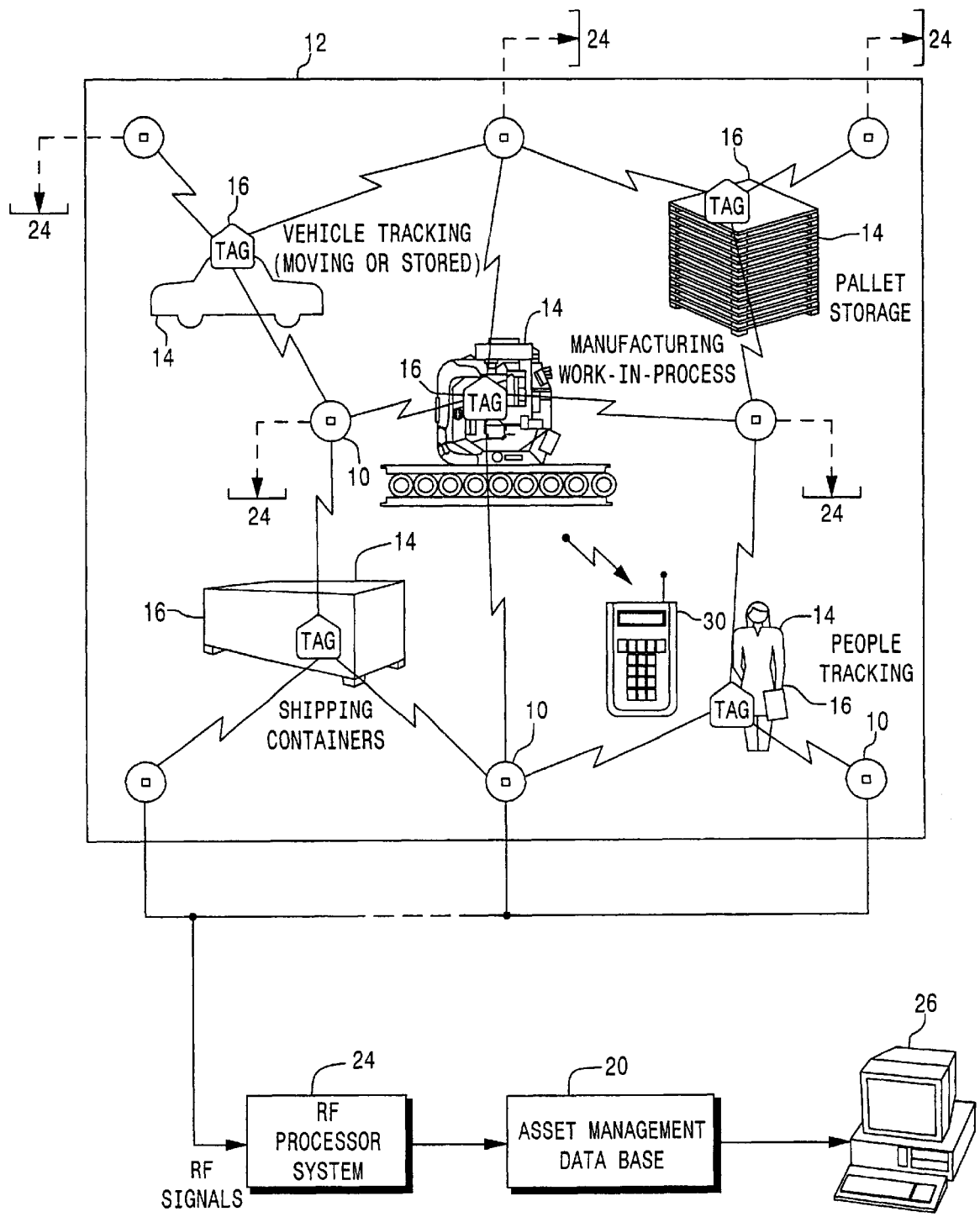
FIG. 1 diagrammatically illustrates the general architecture of a tagged object tracking and location system detailed in the above-referenced '287 and '046 patents.
Figure 2:
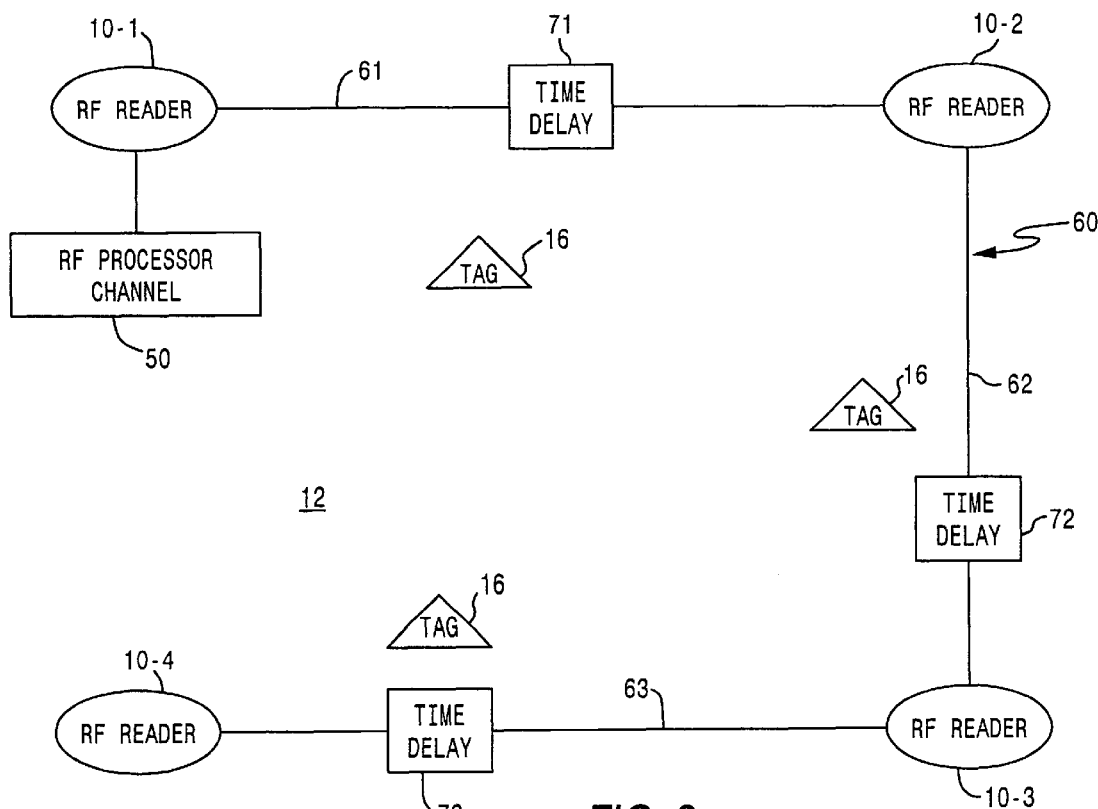
FIG. 2 is a reduced complexity diagram of a modification of the infrastructure of the geolocation system of FIG. 1, in which multiple reader outputs are time division multiplexed to a single shared RF channel processor in a daisy chain embodiment of the present invention.

Attention is initially directed to FIG. 2, which diagrammatically illustrates a reduced complexity geometry embodiment of the time division multiplexed reader to shared RF channel processor signal transport network of the invention. In FIG. 2, the geometry of an asset management environment 12 is shown as being generally rectangular, with a plurality (here four, as a non-limiting example) of tag transmission readers, shown at 10-1, 10-2, 10-3 and 10-4, placed at the 'corners' of the environment's perimeter.

Pursuant to this first embodiment, the time division multiplexing functionality of the signal transport network between the readers and a single, shared RF channel processor 50 is implemented by a serial interconnectivity architecture. In particular, this serial network architecture is configured as a daisy chain transport path among multiple readers and the RF channel processor, with respective segments of the daisy chain interconnect containing embedded delays that enable the shared RF channel processor to receive the output of each reader in a known, independent time frame.

To this end, the single, shared RF channel processor 50 is installed in a signal transport path 60 that links all of the readers 10 with the processor via a daisy-chain of respective sections 61, 62 and 63 of the transport path 60, shown as having associated transport delays 71, 72 and 73. In addition to whatever delay is inherent in the sections of cable, these transport delays may also contain additional delay stages that provide isolation from delayed multi-path signals within a read interval. These delays are periodically measured by means of the calibration mechanism detailed in the above-referenced '646 application, so as to effectively eliminate timing errors in the times of occurrence of the first-to-arrive signals identified by the RF channel processor 50.

As described briefly above, in order for the RF channel processor to determine which tag signal came from which reader, the RF signal emitted from any given tag 16 must be detected by that reader whose 'time slot' is the first time slot in the time slot sequence through which the reader outputs are time division multiplexed via the transport link 60 to the RF channel processor 50. In the illustrated example of a relative small area rectangular environment, the RF channel processor 50 is coupled directly to reader 10-1 as the first reader in the daisy chain sequence, with the outputs of the remaining readers 10-2, 10-3 and 10-4 being daisy chain-coupled in that order to RF channel processor 50.

Figure 3:
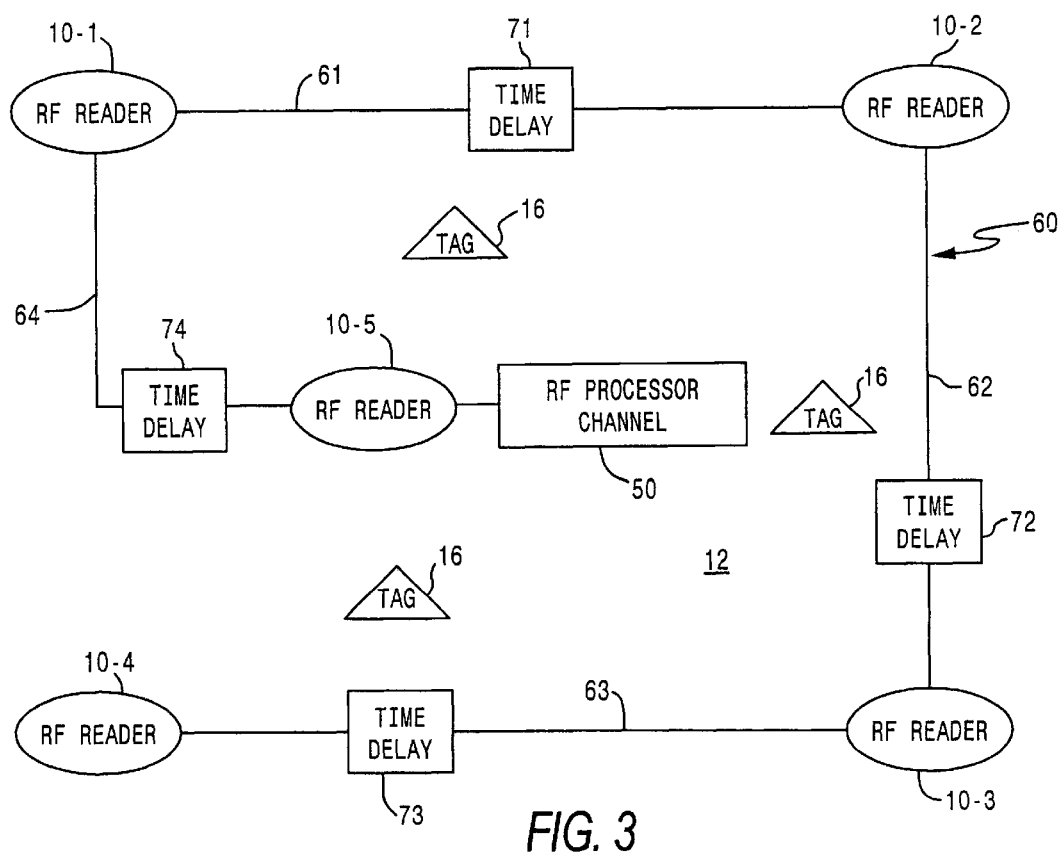
FIG. 3 shows a modification of the daisy chain architecture of FIG. 2 in which an additional reader is placed at a location within the monitored environment, where reasonably good RF coverage over the entire area of the environment is assured.

If the geometry of the monitored environment is such that this cannot be effected for any of the readers located at perimeter locations (such as the area corners) of the environment (e.g., corner reader 10-1 in the present embodiment), then an additional reader may be installed at an appropriate spatial location that will ensure first detection by that reader, and the RF channel processor coupled directly to the additional reader. A non-limiting example of such an alternative configuration is shown in the modified architecture of FIG. 3, wherein a fifth reader 10-5 is placed at a 'generally central' interior location within the monitored environment, where reasonably good RF coverage over the entire area of the environment is assured. A time delay stage 74 is installed in the daisy chain segment 64 linking the corner reader 10-1 and the central reader 105. This additional reader 10-5 may also be used as a data point to optimize location performance.

Figure 4:
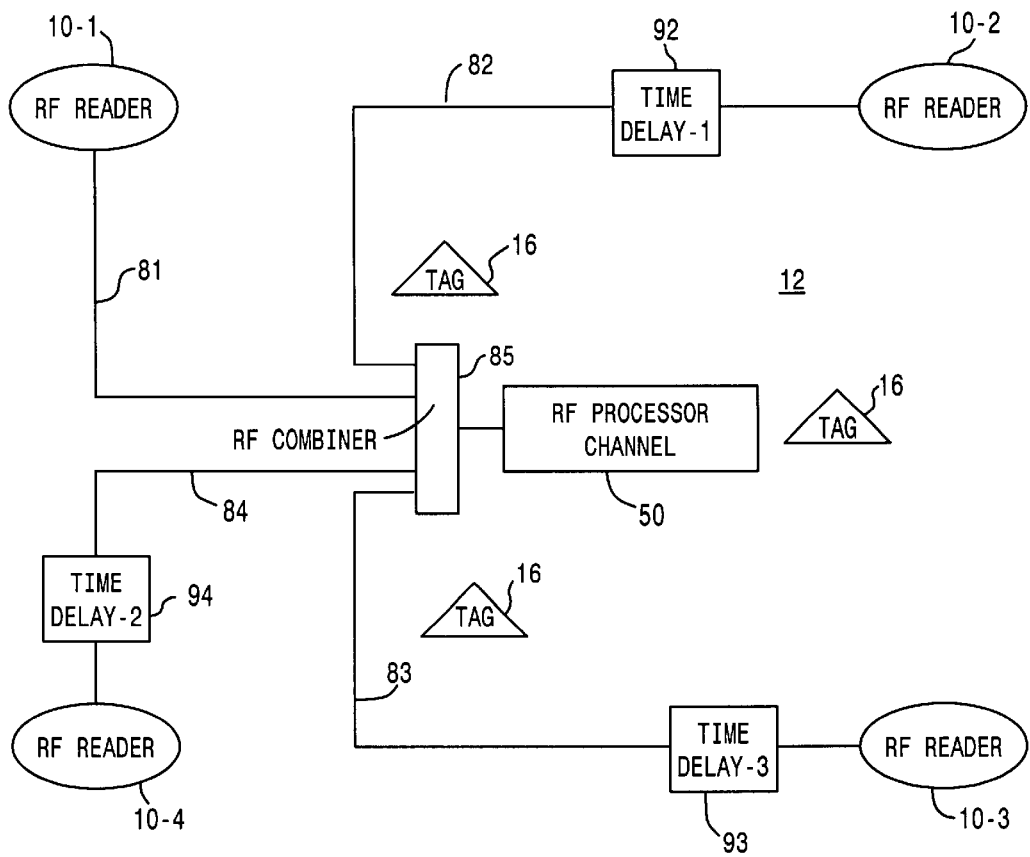
FIG. 4 shows a reduced complexity embodiment of a second embodiment of the invention, in which the time division multiplexed reader to shared RF channel processor signal transport network has a 'star' configuration.

FIG. 4 shows a reduced complexity embodiment of a second embodiment of the invention, in which the time division multiplexed signal transport network linking the tag readers and the RF channel processor has a parallel interconnectivity or 'star' configuration. Again, as a educed complexity, non-limiting example, the geolocation infrastructure contains four tag transmission readers, shown at 10-1, 10-2, 10-3 and 10-4 and located at 'corners' of a generally rectangularly configured asset management environment 12.

In the star configuration embodiment of FIG. 4, the outputs of the tag transmission readers 10-1, 10-2, 10-3 and 10-4 are coupled via respective signal transport paths 81, 82, 83 and 84 to a summing node or signal combiner 85, the output of which is coupled to the RF channel processor 50. The respective sections of transport paths 82, 83 and 84 from readers 10-2, 10-3 and 10-4 are shown as having associated transport delay stages 92, 93 and 94, while the transport path 81 from reader 10-1 to the combiner 85 contains no inserted delay stage.

As in the embodiment of FIG. 2, in addition to including whatever delay is inherent in their associated sections of cable, the transport delay stages of the star configuration embodiment of FIG. 4 impart additional delay, as necessary, to ensure isolation from delayed multi-path signals within a read interval. Also, these delays are preferably periodically measured using the calibration mechanism detailed in the '646 application, in order to effectively eliminate timing errors in the times of occurrence of the first-to-arrive signals identified by the RF channel processor 50.

Because emissions from a tag 16 are asynchronous, there is no 'convenient' way of knowing a priori when any of the readers will receive a transmission. A practical resolution of this reader identification problem is to include, as part of the output of each reader being forwarded to the RF channel processor, a 'signature' that associates that particular reader with the tag signal it receives.

Figure 5:
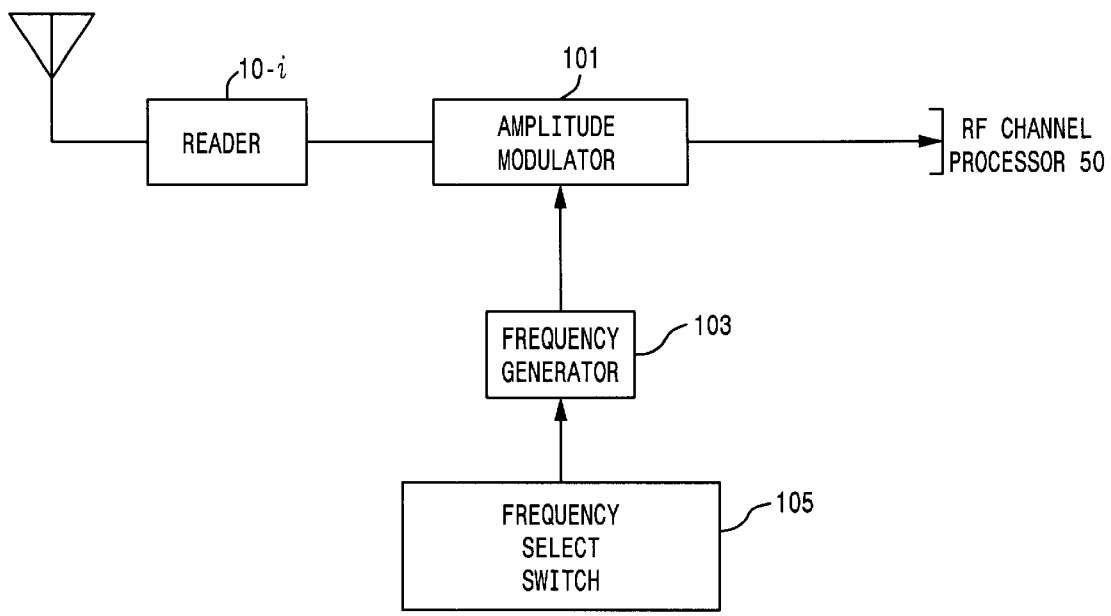
FIG. 5 shows a non-limiting example of an amplitude modulation scheme for signature attachment at the reader.

FIG. 5 shows a non-limiting example of an amplitude modulation scheme for signature attachment at the reader. Here, the output of a respective reader 10-i is coupled to an amplitude modulator 101. The output of the amplitude modulator 101 is applied to the signal transport link 60. The amplitude modulator is further coupled to the output of frequency or tone generator 103, the frequency of which may be set by frequency select switch 105.

In this signature attachment embodiment, the amplitude modulator 101 modulates the output of the reader 10-i with a tone (frequency) supplied by frequency generator 103. As an alternative, a code generator may be used to supply a prescribed digital code sequence to the amplitude modulator 101. In this amplitude modulation approach, the outputs of the differently spatially located readers are superimposed with respectively different tones or codes to represent their identities.

Figure 6:
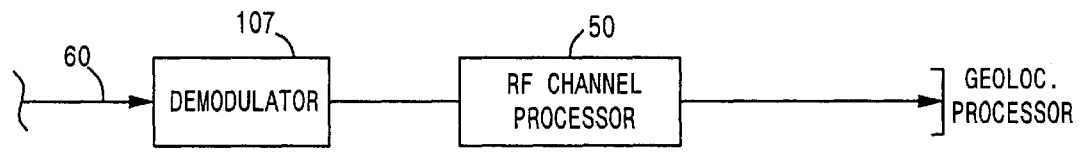
FIG. 6 shows a modification of the front end of the RF channel processor to recover signature information modulated onto reader output signals.

FIG. 6 shows a modification of the front end of the RF channel processor 50 that may be employed to recover signature information that has been modulated onto the reader output signals. In particular, the front end of the downstream RF channel processor 50 is coupled to a demodulator 107, which detects the modulation tone and thereby associates the tag transmission signal with the particular reader receiving it.

While amplitude modulation is useful, it is considered less than optimum, since elimination of amplitude variations from the system is generally desired. A more robust modulation scheme, shown in FIG. 7, involves replacing the amplitude modulator 101 of FIG. 5 with a phase modulator 111 of very low modulation (mod) index. A low mod index will not disrupt any existing modulations in use in the system; in addition, it may also be readily detected in the RF channel processor by installing a straightforward software addition of demodulation code. Moreover, in the phase modulation approach, existing limiting and/or automatic gain control will not disrupt the signature signal.

Figure 7:
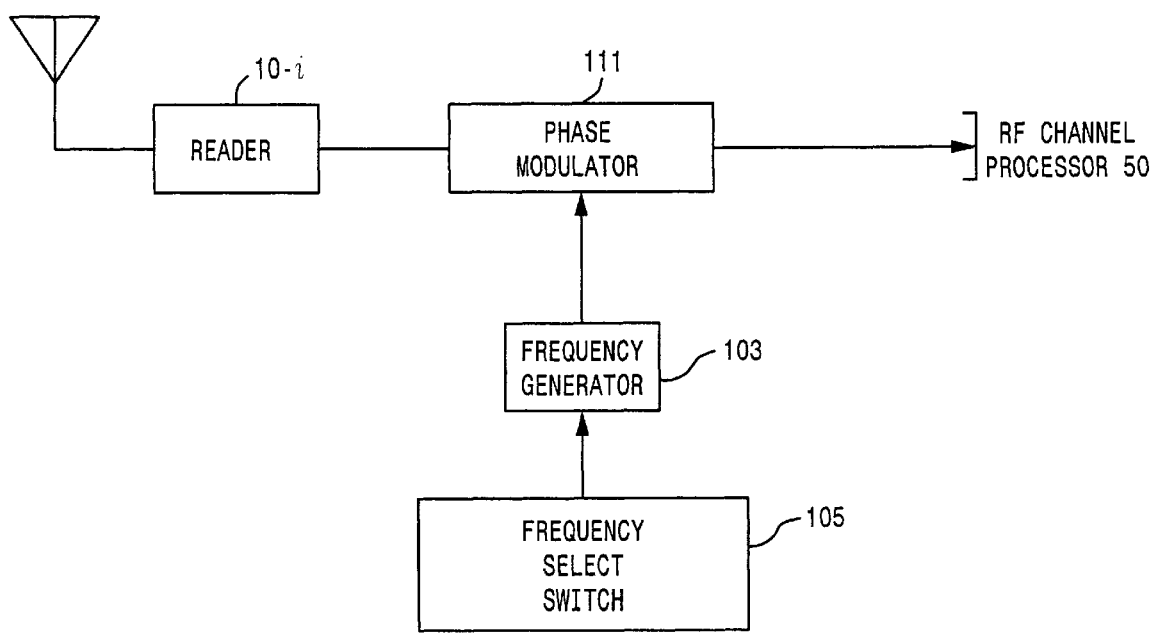
FIG. 7 shows a non-limiting example of a phase modulation scheme for signature attachment at the reader.

In the phase modulator configuration of FIG. 7, the phase modulator 111 is driven by frequency generator 103, the frequency/tone of which is set for a respective reader location by frequency select switch 105. The output of the phase modulator 111 is coupled to the signal transport link 60. The phase modulator of FIG. 7 involves the use of a tone/frequency which identifies a specific reader supplying the tag signal. Although the modulation index is very low, the entire message length of a tag signal can be used to enhance detection probability.

As will be appreciated from the foregoing description, the time division multiplexed reader to shared RF channel processor signal transport network of the present invention is particularly useful in an application where the number of readers required is relatively small, allowing the use of only a single shared RF channel processor. The differential signal transport delays among respective segments of the network creates an inherent set of time division multiplexed time slots for the various readers, that allows the shared RF channel processor to accommodate the outputs of all readers without mutual interference. As pointed out above, this reduction in the number of reader and RF channel processor components allows the cost of the infrastructure of the system to be significantly reduced.

While we have shown and described several embodiments in accordance with the present invention, it is to be understood that the same is not limited thereto but is susceptible to numerous changes and modifications as known to a person skilled in the art, and we therefore do not wish to be limited to the details shown and described herein, but intend to cover all such changes and modifications as are obvious to one of ordinary skill in the art.

What is claimed is:

1. For use with a system for locating objects within a monitored environment, wherein wireless transmissions from tags associated with objects are detected at a plurality of spaced apart tag transmission readers, and outputs of said tag transmission readers are processed to locate said tags and thereby their associated objects within a monitored environment, a method comprising the steps of:

(a) time-division-multiplexing said outputs of said tag transmission readers to a shared processor which is operative to process outputs of and identify first-to-arrive tag transmissions at said tag transmission readers; and (b) processing signals representative of said first-to-arrive tag transmissions as identified by said shared processor so as to geolocate said tags and thereby their associated objects within said monitored environment.

2. The method according to claim 1, wherein step (a) comprises time-division-multiplexing outputs of said tag transmission readers to said shared processor by way of signal transport paths that impart delays providing isolation with respect to delayed multi-path signals within a tag transmission detection interval.

3. The method according to claim 1, wherein said tag transmission readers are daisy chain-coupled to said shared processor.

4. The method according to claim 1, wherein said tag transmission readers are star-coupled to said shared processor.

5. The method according to claim 1, wherein a selected tag transmission reader is located at a spatial location that will ensure first detection thereby of a tag transmission from any of said tags.

6. The method according to claim 1, wherein that tag transmission reader having a first time slot within a sequence of time-division-multiplexed outputs of said tag transmission readers to said shared processor is located at a spatial location that will ensure first detection thereby of a tag transmission from any of said tags.

7. The method according to claim 1, wherein step (a) includes incorporating information representative of the identification of a respective reader as part the output thereof that is time-division-multiplexed to said shared processor.

8. The method according to claim 7, wherein step (a) includes modulating the output of a respective reader with information representative of the identification of said respective reader.

9. The method according to claim 8, wherein step (a) includes amplitude modulating the output of a respective reader with information representative of the identification of said respective reader.

10. The method according to claim 8, wherein step (a) includes phase modulating the output of a respective reader with information representative of the identification of said respective reader.

11. For use with a system for locating objects, wherein wireless transmissions from tags associated with objects are detected at a plurality of spaced apart tag transmission readers, a subsystem for processing outputs of said tag transmission readers to locate said tags and thereby their associated objects within a monitored environment, said system comprising:

a shared reader processor that is operative to process outputs of and identify first-to-arrive tag transmissions at said tag transmission readers; and a transport path arrangement coupled between said tag transmission readers and said shared reader processor that is adapted to time-division-multiplex outputs of said tag transmission readers to said shared processor, and wherein signals representative of first-to-arrive tag transmissions identified by said shared reader processor are processed to geolocate said tags and thereby their associated objects within said monitored environment.

12. The subsystem according to claim 11, wherein said transport path arrangement includes signal transport paths that impart delays providing isolation with respect to delayed multi-path signals within a tag transmission detection interval.

13. The subsystem according to claim 11, wherein said transport path arrangement has a daisy-chain configuration.

14. The subsystem according to claim 11, wherein said transport path arrangement has a star configuration.

15. The subsystem according to claim 11, wherein a selected tag transmission reader is located at a spatial location that will ensure first detection thereby of a tag transmission from any of said tags.

16. The subsystem according to claim 11, wherein that tag transmission reader having a first time slot within a sequence of time-division-multiplexed outputs of said tag transmission readers to said shared processor is located at a spatial location that will ensure first detection thereby of a tag transmission from any of said tags.

17. The subsystem according to claim 11, wherein a respective reader output incorporates information representative of the identification of said respective reader that is time-division-multiplexed by said transport path arrangement to said shared processor.

18. The subsystem according to claim 17, wherein a respective reader is coupled to a modulator which is adapted to modulate the output of said respective reader with information representative of the identification thereof, and wherein said transport path arrangement is operative to transmit said information to said shared processor.

19. The subsystem according to claim 18, wherein said modulator comprises one of an amplitude modulator, and a phase modulator.

20. A communication subsystem for use with a system for locating objects, wherein wireless transmissions from tags associated with objects are detected at a plurality of spaced apart tag transmission readers, comprising:

a shared reader processor that is operative to process outputs of and identify first-to-arrive tag transmissions at said tag transmission readers supplied thereto;

a transport path arrangement coupled between said tag transmission readers and said shared reader processor and being operative to time-division-multiplex outputs of said tag transmission readers to said shared processor; and a location processor which is operative to process signals representative of said first-to-arrive tag transmissions identified by said shared reader processor to geolocate said tags and thereby their associated objects within said monitored environment.

\* \* \* \* \*